March 19, 1963 L. M. HUBBY 3,081,636
APPARATUS FOR MEASURING VOLUME OF OIL IN A MIXTURE
Filed May 22, 1959 4 Sheets-Sheet 1

March 19, 1963    L. M. HUBBY    3,081,636
APPARATUS FOR MEASURING VOLUME OF OIL IN A MIXTURE
Filed May 22, 1959    4 Sheets-Sheet 2
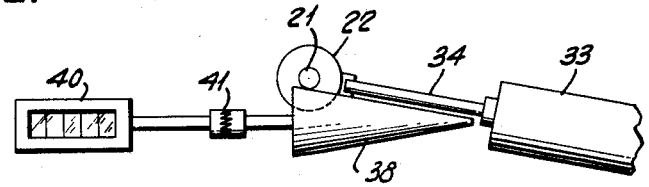
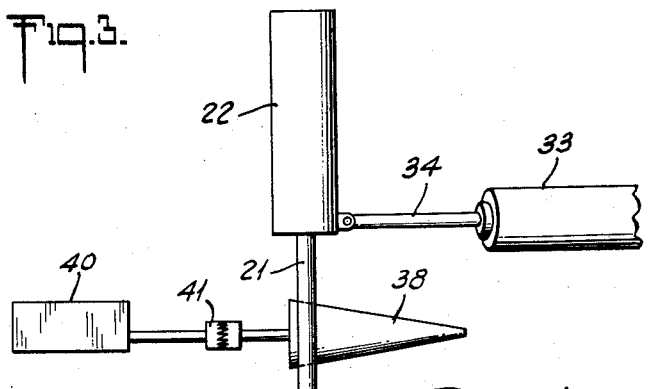
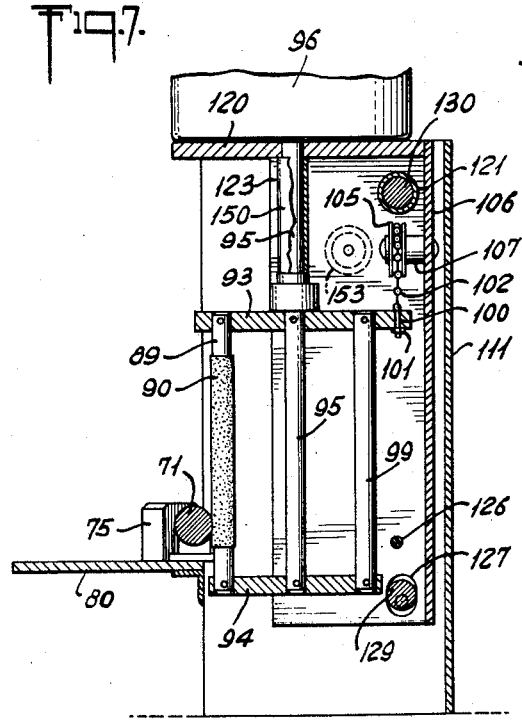
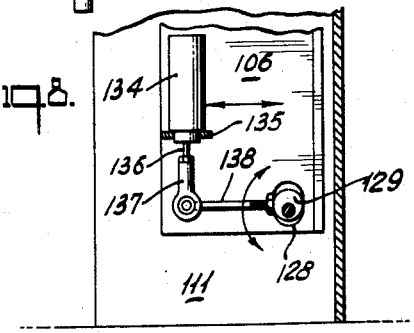
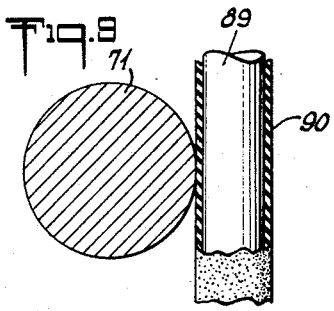

March 19, 1963 L. M. HUBBY 3,081,636
APPARATUS FOR MEASURING VOLUME OF OIL IN A MIXTURE
Filed May 22, 1959 4 Sheets-Sheet 3

March 19, 1963  L. M. HUBBY  3,081,636
APPARATUS FOR MEASURING VOLUME OF OIL IN A MIXTURE
Filed May 22, 1959  4 Sheets-Sheet 4

United States Patent Office 3,081,636
Patented Mar. 19, 1963

3,081,636
APPARATUS FOR MEASURING VOLUME OF
OIL IN A MIXTURE
Laurence M. Hubby, Bellaire, Tex., assignor to Texaco
Inc., a corporation of Delaware
Filed May 22, 1959, Ser. No. 815,132
13 Claims. (Cl. 73—438)

This invention is concerned with an apparatus for measuring the volume of oil in a predetermined volume of a mixture containing oil and water.

Heretofore, in production of oil it has been the procedure in measuring the quantity of crude oil produced, to make a determination of the amount of water present and thereafter to make the calculation required to subtract the water volume from the total volume of fluid in order to determine the amount of oil being produced. Such former operation was called a "water-cut" procedure, and as indicated, the procedure involved a calculation in connection with the amount of mixture (or emulsion) of water and oil in order to determine the figure concerning how much of this mixture was oil alone.

In contrast with the foregoing arrangement, the present invention provides a system for measuring the amount of oil in the mixture so as to provide a direct indication thereof.

Thus, it is an object of this invention to provide a system for measuring directly the volume of oil in a given volume of a mixture containing such oil and some water.

Another object of the invention is to provide an improved system for measuring the volume of oil in a predetermined volume of mixture which contains the oil and some water. Such system lends itself to providing a direct determination of the amount of oil by means of a percentage of the oil existing in the quantity of mixture that is contained in a measured volume of the mixture.

Another object of the invention is to provide a general purpose ratio-computer for periodically measuring the ratio of two quantities.

The invention may also be briefly described as a system for measuring the volume of oil in a predetermined volume of a mixture containing said oil and some water. The system comprises in combination, means for measuring a first density difference between said mixture and said water, and means for measuring a second density difference between said oil and said water. The combination also comprises means for measuring the ratio of said first and said second density differences whereby the percent of said oil in said predetermined volume of mixture is directly determined.

The invention may also be briefly described as a system for measuring the ratio of two quantities, which comprises means for taking a cone having proportions thereof such that the circumference at any point is equal to the distance from such point to the apex of the cone. In addition it comprises means for positioning a transverse cone drive member along the surface of said cone from the apex for a distance proportional to one of said quantities, and means for translating said member longitudinally while in driving relation with said cone for a distance proportional to the other of said quantities so that said cone will be rotated in terms of revolutions an amount equal to the ratio of said two quantities.

Also, the invention may be briefly described as a ratio computer for periodically measuring the ratio of two quantities. Such computer comprises a cone having the proportions thereof such that their circumference at any point is equal to the distance from such point to the apex of the cone. The computer also comprises a transverse cone drive member for rotating said cone about its axis, and means for positioning said member laterally for a distance along the surface of said cone proportional to one of said quantities. And, the computer comprises means for translating said member longitudinally thereof while in driving relation with a circumference of said cone for an effective distance proportional to the other of said quantities, whereby said cone is rotated about its axis an amount equal to the ratio of said two quantities.

The foregoing and other objects and benefits of the invention will be more fully appreciated in connection with the detailed description thereof which follows, and which is illustrated in the drawings, in which:

FIG. 2 is an enlarged schematic showing in elevation, including additional elements that are employed with the FIG. 1 system;

FIG. 3 is a similarly enlarged schematic showing in plan view, of the same additional elements shown in FIG. 2;

FIG. 7 is a cross sectional view taken along the lines 7—7 of FIG. 6, looking in the direction of the arrows;

FIG. 8 is a detail view of some of the elements of the ratio computer, taken along the lines 8—8 of FIG. 6, looking in the direction of the arrows;

FIG. 9 is an enlarged detail view, largely in cross section, showing the relationship of the cone to the drive bar which rotates the cone.

Figure 1:
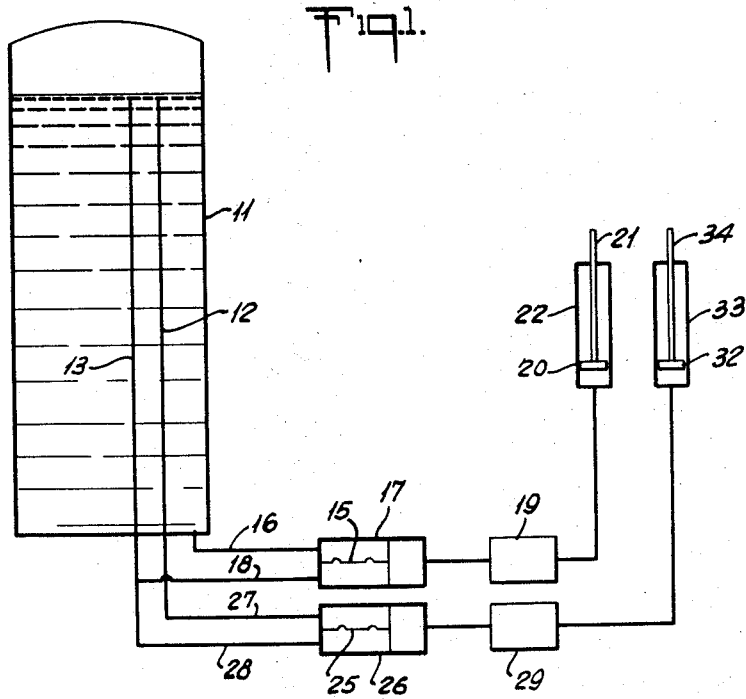
FIG. 1 is a schematic diagram illustrating part of the elements of a system for carrying out the invention according to one embodiment thereof.

Referring to FIGS. 1, 2, and 3, the system according to this invention may be described as follows. There is a measuring tank 11 that holds a predetermined volume of liquid when filled to a calibrated level just above the tops of two pipes 12 and 13, which are filled with substantially one hundred percent oil and substantially one hundred percent water respectively. The oil and the water in these two columns are preferably taken from the source of the mixture that is introduced into the tank 11, in order that the comparisons of densities which are made will be most accurate. It may be observed that, although, in this disclosure the densities are not directly measured, the pressures that are measured are functions of the densities concerned.

One manner of obtaining the water and oil from the mixture that is being measured, is disclosed in my copending application Serial No. 665,095 filed June 11, 1957, now Patent No. 3,009,359, issued November 21, 1961. Of course, other arrangements might be employed, and there is no specific showing in the schematic diagram of FIG. 1 for making this separation.

There is a pipe 16 leading from the bottom of the tank 11, that carries the emulsion or mixture of oil and water that is in the tank 11 to one side of a differential pressure sensing element 17. There is a pipe 18 which connects the other side of a diaphragm 15 within the pressure differential sensing element 17, to the column of water in pipe 13. Thus the element 17 compares the difference in pressure between a column of the water-oil mixture in tank 11, with the pressure of a column of water that is in the pipe 13 and that has an equal height (because of the arrangement whereby the top of the water-oil mixture in tank 11 lies just above the open top of the water column in pipe 13).

Connected to the element 17, to be controlled thereby, there is a servo control system that is schematically indicated by a box 19. This servo system 19 acts to determine the position of a piston 20 that carries a piston rod 21, both of which are located within a cylinder 22, and both of which are positioned in accordance with the differential pressure indicated by the sensing element 17.

In a similar manner, there is another differential pressure measuring element 26 that has a diaphragm 25 therein with one side thereof connected to the oil column in pipe 12 by means of a pipe 27. The other side of the diaphragm 25 in element 26, is connected via a pipe 28 to the water column in pipe 13. The element 26 is a pilot, or control element for another servo control system 29 that determines the position of a piston 32 within a cylinder 33, and of course the position of a piston rod 34 that is attached to the piston 32. Thus, similarly as above, the piston rod 34 is positioned in accordance with the differential pressure indicated by the sensing element 26.

It will be observed that the position or amount of extension of the piston rod 21 will be directly dependent upon the pressure differential between the column of emulsion in the tank 11 and the column of water in the pipe 13. Similarly, the position of piston rod 34 will be directly dependent upon the differential in pressure between the column of oil in pipe 12 and the column of water in pipe 13. Now, turning to FIGS. 2 and 3, it will be observed that by employing the amount of extension of the piston rods 21 and 34 from a zero or starting point, the ratio of (1) the differential pressure between the emulsion and water columns, to (2) the differential pressure between the oil and water columns, may be directly determined.

The apparatus for determining the ratio of these two differential pressures is basically indicated in FIGS. 2 and 3. It includes a cone 38 that is proportioned such that the distance around the circumference of the cone at any point along its surface, is equal to the distance of such point from the apex of the cone. By reason of these proportions, the ratio of the two differential pressures will be measured in terms of the amount of revolution of the cone. For example, the differential pressure between the oil column 12 and the water column 13, will cause a given extension of the piston rod 34 and this in turn will move the cylinder 22 (and its piston rod 21) laterally along the surface of the cone 38 for a given distance. (Note that rod 34 is attached to cylinder 22.) Thereafter, the differential pressure between the mixture column 11 and the water column 13, will be applied to position the piston rod 21 while it is in contact with the surface of the cone 38. On account of the proportions of the cone 38, this positioning of the piston rod 21 will cause the cone 38 to be rotated an amount that is dependent upon the prior positioning of the cylinder 22 (and piston rod 21) to a given point along the surface of the cone. The resulting revolution of the cone is in this case a direct indication of the percentage of oil in the mixture because the differential pressures are in each case ratios of the respective quantities; and therefore the common term, i.e. water, is in effect cancelled out and the ratio is that of the oil relative to the mixture.

There is a revolution counter 40 that is connected to the cone 38 by a shaft which includes a ratchet connection 41. The ratchet 41 acts to allow the cone 38 to rotate back when the piston rod 21 is returned to its zero or starting position, without turning the counter 40 in reverse. In this manner the revolution counter 40 will be rotated an amount that is directly proportional to the amount of oil contained in the volume of mixture that is in the tank 11, as was indicated above. It will be observed that this is the case because of the fact that the ratio which is obtained is that of the differential (or ratio) of the emulsion density and the water density, divided by the differential (or ratio) of the oil density and the water density. Since it is a ratio that is determined, the common unit, i.e. the water density, is eliminated and the results are the direct ratio of the oil to the emulsion (or mixture).

Figure 4:
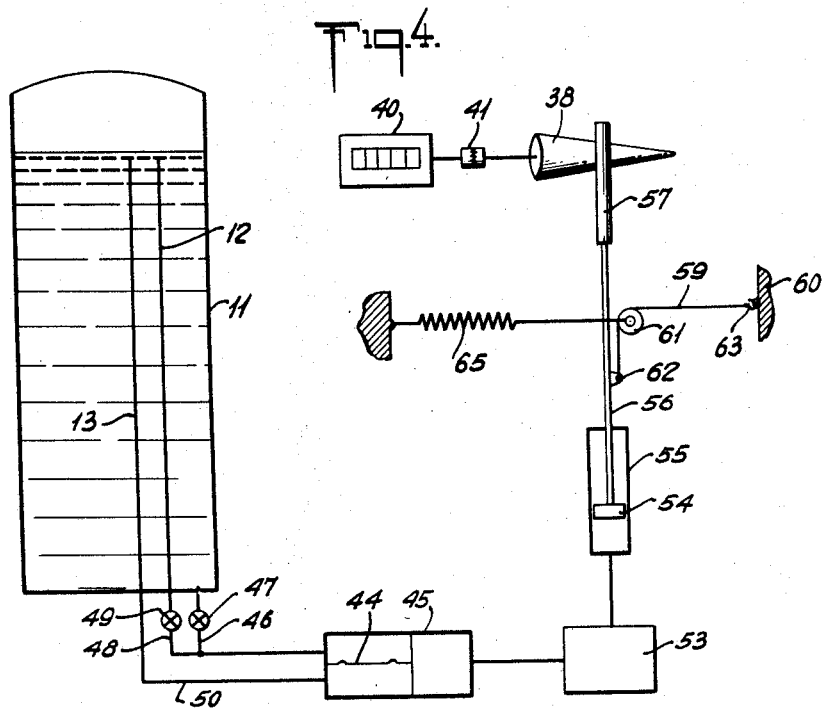
FIG. 4 is a schematic showing of all of the elements of a system according to a different embodiment of the invention.
Figure 5:
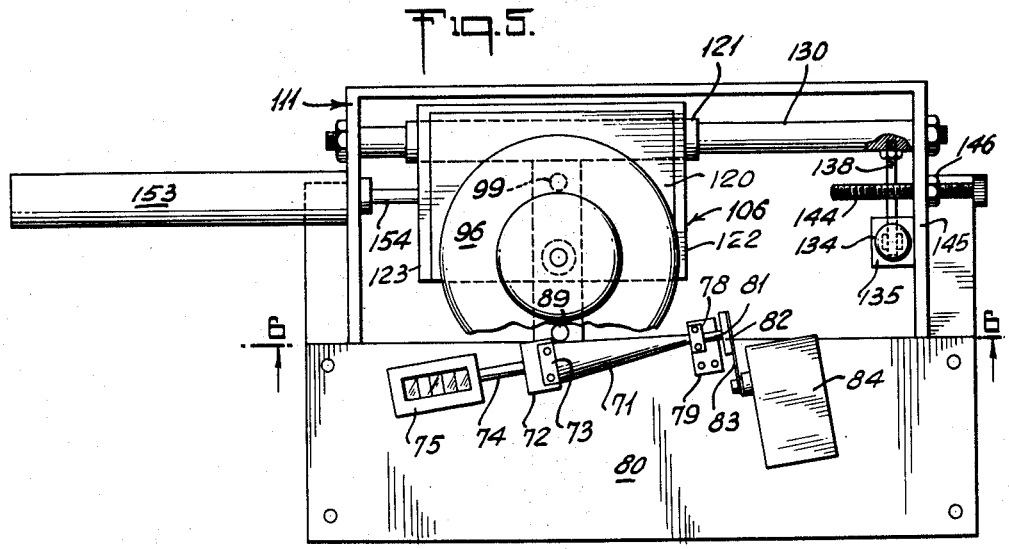
FIG. 5 is a plan view of the particular structure for a ratio computer alone, according to the invention.

Another arrangement of apparatus for carrying out the same method, is illustrated in FIG. 4. In this arrangement a single, piston positioning apparatus is employed. It is used for each of the two differential pressures that have their ratio determined, so that the effects of equipment action may be balanced out and the results be unaffected thereby.

The elements of the FIG. 4 system which are the same as those of the FIG. 1 arrangement will be given the same reference numbers so that a comparison may be more readily made. Thus, in FIG. 4 there is the tank 11 having the pipe 12 carrying a column of oil therein and the pipe 13 carrying a column of water. At the other end of the system, there is the same counter 40 connected via a ratchet 41 to the cone 38. With the FIG. 4 arrangement however, there is only a single differential pressure measuring element 45 which has a diaphragm 44. The two sides of the diaphragm 44 in the element 45 are connected alternatively to (1) the column of mixture in tank 11 via a pipe 46 and a valve 47, plus the column of water 13 via a pipe 50; or, to (2) the column of oil 12 via a pipe 48 and a valve 49, plus the column of water 13 via pipe 50 again. It will be noted that the differential pressure element 45 is connected alternatively as indicated, by manipulating the valves 47 and 49 as required for the alternative connections.

With the foregoing (FIG. 4) arrangement, there is needed only a single servo control system 53 for positioning a piston 54 within a cylinder 55 to cause varying amounts of extension of a piston rod 56. In this arrangement the piston rod 56 has a roller 57 at the end thereof, which roller is in contact with the surface of the cone 38. In addition there is a cable 59 that is detachably connected to a frame, or immovable member 60, e.g. by means of a hook 63 illustrated. The cable 59 passes over a pulley 61, and is attached to a bracket 62 that is carried by the piston rod 56. The pulley 61 will be mounted on some part of the structure (not shown) that supports the cylinder 55; so that when the piston 54 moves and the piston rod 56 is thus extended, the cable 59 will be payed out. The slack thus provided will be taken up by a spring 65 which acts to move the cylinder 55 laterally along with the piston rod 56 and roller 57. This lateral movement is to the left (as viewed in FIG. 4) commencing from a position at the apex of cone 38, and extending for a distance along the cone that is determined by the amount of extension of the piston rod 56. This lateral movement will take place with the differential pressure element 45 connected to the oil column 12 and the water column 13.

Then, the alternative pressure differential connections to element 45 are made after disconnection of the cable 59 from the frame 60, without disturbing the lateral position of the roller 57 along the cone 38. Next, the repositioning of piston 54 and piston rod 56 will be carried out with the differential pressure element 45 connected to receive the pressures from the emulsion column 11 and the water column 13. When this second positioning of the piston rod 56 is carried out the roller 57 will be in contact with the surface of the cone 38 and will be moved longitudinally of the roller so that the counter 40 will thus be rotated (from cone 38) for an amount that is direct ratio of the oil to the mixture in tank 11.

Referring to all of the apparatus so far described, a measurement of the volume of oil in a predetermined volume of a mixture that contains such oil, and some water, may be carried out by various steps. The steps involved in such measurement include the measuring of the density difference between the mixture, and the water that is in such mixture. This density difference measurement is carried out by having a differential pressure element (17 of FIG. 1, or the differential pressure element 45 of FIG. 4) measure the difference in pressure of equal height columns of the two fluids. This gives an indication that is a function of the density of each of these fluids. Another step is that of measuring the density difference between the oil (of the mixture) and the water (of the mixture). This density measurement also may be carried out by a differential pressure measuring element (26 in FIG. 1, or element 45 in FIG. 4 when it is connected to the column 12 for the oil measurement). Here again the difference in pressure of equal height columns of the two fluids gives an indication that is a function of the density of the fluid. Next, the ratio of the first density difference relative to the second density difference will be measured so as to determine the percentage of oil that is in the mixture. This ratio measurement may be carried out with the FIG. 1 arrangement by first positioning the piston rod 34 in accordance with the differential pressures between the column of oil and the column of water. This positioning of piston rod 34 is arranged (e.g. as illustrated in FIGS. 2 and 3) to move the piston rod 21 laterally along the surface of the cone 38. Then the differential pressure measurement between the column of emulsion in tank 11 and the column of water in pipe 13 may be applied to control the position of the piston rod 21 longitudinally thereof, while in contact with the surface of the cone 38. This will rotate the cone and the shaft that is connected to the counter 40, so as to indicate the percentage of oil that is in the predetermined volume of mixture.

The same ratio measuring step is carried out with the FIG. 4 apparatus by first connecting the differential pressure element 45 to the oil and water columns, thus causing piston rod 56 to be displaced and moved laterally over the surface of the cone 38 for a distance controlled by this pressure differential. Then the cable 59 will be disconnected and after the return of the piston to its starting position, the positioning of the piston 54 will this time be under the influence of the pressure differential measurement between the equal height columns of the mixture in tank 11, and the water in pipe 13. While this latter positioning is carried out (moving the piston rod 56 longitudinally only), the roller 57 will be in contact with the cone 38 so that the cone will be rotated and cause counter 40 to rotate an amount that is proportional to the percentage of the oil that is in the mixture in tank 11.

It is pointed out that the FIG. 1 and FIG. 4 systems are quite schematic in the illustration thereof. Thus, it will be understood that the fluid pipes connecting the pressure differential elements will be arranged to have the effective "head" of the different columns all equal so that the density of the fluids will be the main factor that creates the pressure differential.

It will be appreciated that the type of measurement that is made in accordance with this invention is periodic in nature. Also, the ratio indication is one of relative values. Therefore by taking the measurement of the ratio once for each measuring tank full of the mixture, the amount of oil in each tank full of the mixture is determined by reason of the percentage determination thus made.

*Ratio Computer*

A specific embodiment of a ratio computer in accordance with the FIG. 4 schematic illustration, is illustrated in FIGS. 5 through 9. In addition, there is a showing of an automatic system for filling and draining a measuring tank and having this ratio computer connected thereto. The latter is shown in the FIG. 10 diagram.

The ratio computer apparatus that is illustrated as a specific embodiment for the computer aspect of the invention, is illustrated in FIGS. 5 through 9 and may be described as follows:

There is a cone 71 that has the proportions thereof made such that the circumference at any point along the surface, is equal to the distance from such point to the apex of the cone. The cone may be mounted in any convenient manner, e.g. by having a bearing block 72 which supports a bearing 73 that in turn supports the cone 71 at one end thereof by rotation about its longitudinal axis, by means of a shaft 74. Shaft 74 is integrally attached to the cone 71 in any convenient manner, and extends to the input of a revolution counter 75. At the other end of cone 71, i.e. near the apex thereof, there is a bearing 78 that is mounted on a bracket 79 which in turn is mounted on a horizontal apron or plate 80. The tip of the cone 71 is formed into a shaft 81 that cooperates with the bearing 78, and that extends beyond the bracket 79 where it is contacted by an end thrust friction pad 82. Friction pad 82 is supported on a spring arm 83 that is fastened to a support block 84 in any convenient manner. It is pointed out that all of the elements just described in connection with the cone 71, are mounted securely on he plate 80 for maintaining their relative positions as illustrated.

There is a transverse cone-drive member that cooperates with the cone 71 and that includes a drive bar 89 that has a resilient material surface 90 (which may be rubber or similar material) for making frictional contact with the surface of the cone 71. That is, when the drive bar 89 is in its driving position. Drive bar 89 is mounted securely on a pair of cross arms 93 and 94 (see FIGS. 6 and 7) to which the drive bar is attached in any convenient manner, e.g. by means of pins as illustrated. The cross arms 93 and 94 are attached to a piston rod 95 which extends from a positioning member 96 that includes a cylinder and piston arrangement for operation with a servo system. The operation is such that the system controls the positioning of the piston and its piston rod, so that they are positioned in proportion to a controlling input signal. Positioning member 96 forms no part, per se of this invention and may take the form of a pneumatic positioning device such as a commercial one manufactured by the Conoflow Corporation.

Near the other end of the cross arms 93 and 94 from the drive bar 89, there is a guide bar 99 which maintains cross arm 93 in proper alignment and thereby keeps drive bar 89 in correct position with respect to carriage 106. Furthermore, near the same end of the top cross arm 93 there is a chain anchor bolt 100 (see FIG. 7) that passes through the arm 93 and has a nut 101 threaded on to the bolt 100 for making adjustment in the effective length of a chain 102 that is attached at one end thereof to the anchor bolt 100. The chain 102 extends upward from the arm 93 and passes over a pulley 105 that is supportably attached for free rotation on a carriage 106, in any convenient manner such as by means of a support post 107 (FIG. 7) that may be riveted to the carriage 106.

The chain 102 extends beyond the carriage 106 and over another pulley 110 (FIG. 6) that is rotatably supported on a framework 111 which constitutes the main framework for the entire unit. After passing over the pulley 110, chain 102 extends down through an eyelet 112 that is securely attached to the frame 111 beneath and in line with the periphery of the pulley 110. This eyelet 112 acts as a stop member for an adjustable stop nut 113 that is carried at the other (free) end of the chain 102. Stop nut 113 is threadably carried on a short bolt 114 to which the end of the chain 102 is attached. At the free end of the bolt 114 there is attached a light, slack take-up spring 115. The other end of the take-up spring 115 is attached to an anchor bolt 116 that passes through one side of the framework as illustrated in FIG. 6.

Figure 6:
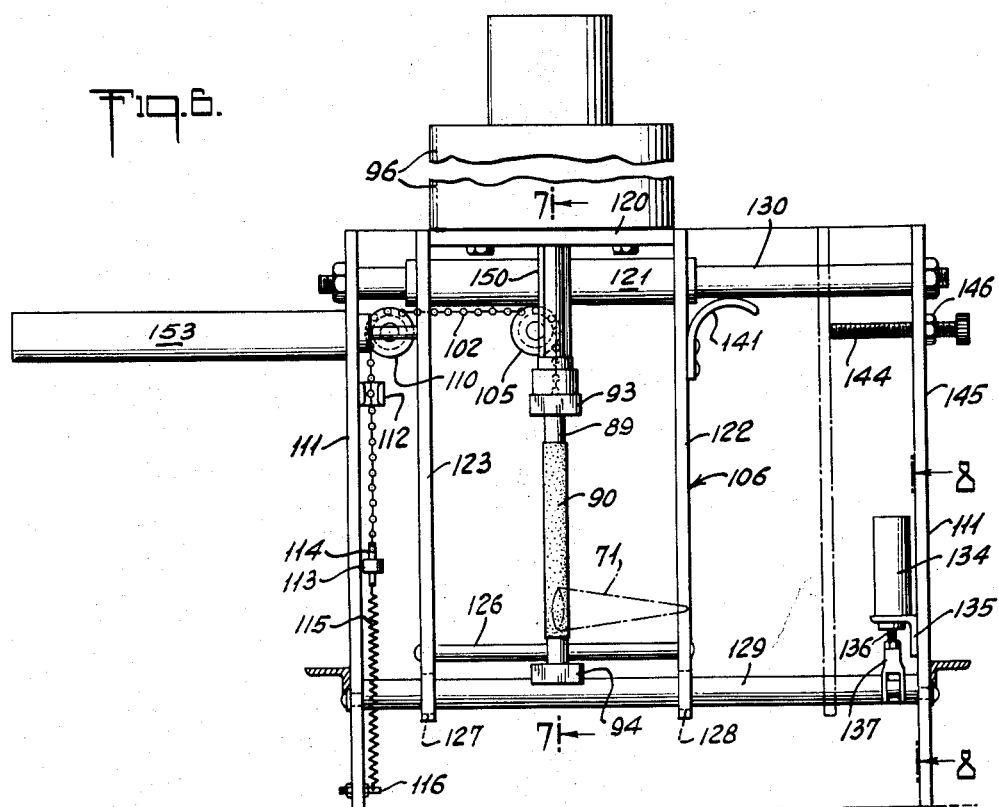
FIG. 6 is an elevational view, taken along the lines 6—6 of FIG. 5, looking in the direction of the arrows.

The carriage 106 has a horizontally disposed top plate 120 which supports the positioning member 96 in any convenient manner, such as by having the positioning member bolted thereto as illustrated (FIG. 6). The carriage 106 itself is slidably supported on the framework 111 for lateral movement, from one side of the framework to the other. Thus, there is a transverse bearing-sleeve 121 that is securely attached to the carriage 106 in any convenient manner, such as by means of a "press fit" where it extends through each of two side plates 122 and 123 that are part of the carriage 106. Near the lower portion of the carriage 106 there is a brace rod 126 that extends across between the side plates 122 and 123, and that is located slightly above a pair of elliptical holes 127 and 128. Passing through the elliptical holes 127 and 128, there is an eccentrically mounted rod 129 that is carried by the framework 111 and lies parallel to an upper rod 130 that acts as the support for the sleeve 121 of the carriage 106.

The eccentric rod 129 is rotatable about an eccentric axis for determining the driving relationship between resilient surface 90 of drive bar 89, and the surface of the cone 71. The rotation is controlled by a cone drive cylinder 134 that is mounted on the framework 111 by any convenient type of bracket, e.g. a bracket 135. Cylinder 134 controls the extension of a piston rod 136 that has attached to the end thereof a coupling yoke 137 for pivotally attaching the end of a radially extending arm 138 that is fastened securely to and extends from the eccentric rod 129 for controlling the rotation thereof.

Referring to FIG. 8 it will be observed that the actuation of the cylinder 134 will cause swinging movement of the arm 138 about the eccentric axis of the rod 129, which in turn will act in cooperation with the elliptical holes 127 and 128 in the carriage 106 to cause forward and backward pivotal motion of the carriage 106 about the center line of the upper rod 130. Such movement of the carriage 106 determines whether or not the drive bar 89 is in driving relation with the cone 71.

It is pointed out that it is probably necessary to mount the cylinder 134 pivotally relative to the framework 111, in order to avoid binding of the piston rod 136, as the piston is actuated. This may be done easily in many ways, e.g. by having the bracket 135 attached to the framework 111 at only one point with freedom to pivot thereabout.

Referring to FIG. 6 it is pointed out that there is a friction drag spring 141 that is securely attached to the side 122 of the carriage 106, and which rests in frictional engagement against the supporting rod 130. This friction drag arrangement is used in order to be sure that the lateral sliding movement of the carriage 106 will only be that occasioned by the first positive positioning action of the piston rod 95 which takes place when the drive bar 89 is not in contact with the surface of the cone 71.

There is a zero stop bolt 144 that is adjustably fastened to the framework 111 by being threaded through a side plate 145 of the framework 111, and by having a lock nut 146 carried on the bolt 144. The zero stop bolt 144 acts in conjunction with the carriage 106, to contact the side 122 thereof and provide a zero position from which the carriage 106 may be slideably positioned to the left (when viewed as illustrated in FIG. 6).

There is a zero spacer sleeve 150 that surrounds the upper portion of the piston rod 95 and acts to limit the retracted position of the piston rod to a predetermined location, for the zero point in connection with each extension of the piston rod under a signal that is supplied to the positioning member 96. It will be appreciated that the operation of the positioning member 96 is such that the piston rod 95 will be biased to a retracted position and thus will return to the zero stop location that is determined by the sleeve 150, whenever there is no signal applied to the member 96.

There is a carriage return cylinder 153 that is supported on the framework 111 and that has in conjunction therewith a piston rod 154 (FIG. 5) which is securely attached to the side 123 of the carriage 106. It is pointed out that the carriage return cylinder 153 acts to push the carriage 106 slideably across to the right (as viewed in FIG. 6) against the zero stop bolt 144 (to the position indicated in dashed lines) whenever a cycle of operation is to begin.

*Operation*

The operation of the ratio computer will be described for general application first, in connection with the illustrations of FIGS. 5 through 9. Then a particular operation of the ratio computer as applied to an automatic measuring system in connection with the measurement of the amount of oil in an emulsion that is being produced, will be described in connection with the system shown in FIG. 10.

Referring to FIGS. 5 through 9, it is pointed out that the operation of the ratio computer may best be described by commencing with the introduction of the first of two quantities that are to have the ratio thereof measured. Thus, before a cycle of the various steps involved is commenced, the carriage return cylinder 153 will be actuated to move the carriage 106 over to the right as viewed in FIG. 6 until it rests against the zero stop bolt 144. Next the larger of the two quantities will be introduced to cause the positioning member 96 to be actuated and extend the piston rod 95 a distance that is proportional to this quantity. As the piston rod 95 is extended, it carries therewith the cross arm 93 which in turn carries the anchor bolt 100 and thus pulls the chain 102 therewith.

When the carriage 106 was positioned against the zero stop bolt 144 the chain 102 was pulled back over the pulley 110 until the stop nut 113 rested against the lower side of the eyelet 112. Also at this stage of the operation, the cylinder 134 will not be actuated and consequently the eccentric rod 129 will stand rotated to a position such that the resilient surface 90 of the drive bar 89 will be out of contact with the surface of the cone 71.

Now, as the piston rod 95 moves longitudinally and carries the cross arm 93 and the attached end of the chain 102 therewith, the carriage 106 is slideably positioned to the left as viewed in FIG. 6, so long as the piston rod 95 continues to be extended. Then when the piston rod 95 has reached its extended position in accordance with the control signal, the carriage 106 will have been moved laterally relative to the axis of the cone 71 for a distance that is proportional to the first of the two quantities that are having the ratio thereof measured.

The carriage 106 will remain in this position after the piston rod 95 is retracted again, for the reason that the friction spring 141 will hold the carriage there. The slack in the chain 102 will merely be taken up by the light spring 115 that is attached to the end of the chain, as the piston rod 95 retracts. This positioning movement has thus provided movement along the surface of the cone that is proportional to one of the two quantities.

Now before the second of the two quantities is introduced to the positioning member 96, the cylinder 134 will be actuated to rotate the eccentric rod 129 and thus place the resilient surface 90 of drive bar 89 into frictional contact with the surface of the cone 71. This takes place at whatever position along the surface of the cone the carriage 106 happens to have set the drive bar, in accordance with the first signal. Next, when the second signal is introduced to the positioning member 96, the piston rod 95 will be extended again and this time it will extend for a distance that is proportional to the second of the two quantities. As this extension takes place the drive bar 89 with its resilient surface 90, will cause the cone 71 to be rotated. The amount of this rotation depends upon the lateral position which was set by the first of the two quantities, in addition to the amount of extension of the piston rod 95 that is caused by the second of the two quantities.

Thus, the shaft 74 of the cone 71 will be rotated and will cause an indication to be set into the revolution counter 75. This indication will in fact be the ratio of the two quantities by reason of the configuration, of proportions of the cone. For example, if the ratio is one, i.e. the first quantity is equal to the second, the cone 71 will be revolved for exactly one revolution and the counter will have a complete "one revolution," input. This will hold true even though the absolute magnitude of each of the two quantities varies somewhat, since the quantities relative to one another will be equal and will therefore produce a complete revolution of the cone 71 by reason of the proportions of the cone indicated above. Similarly, where the ratio of the two quantities is less than one, it still does not matter whether the absolute magnitude of the quantities varies; since the ratio of the two relative quantities is what is measured, irrespective of any like change in magnitude of both of them. This means that instrument errors will tend to cancel out and be eliminated.

After the second of the two quantities has been introduced to cause the desired output as described above, the apparatus may be reset to its zero, or starting position for making another measurement in the same manner.

Figure 10:
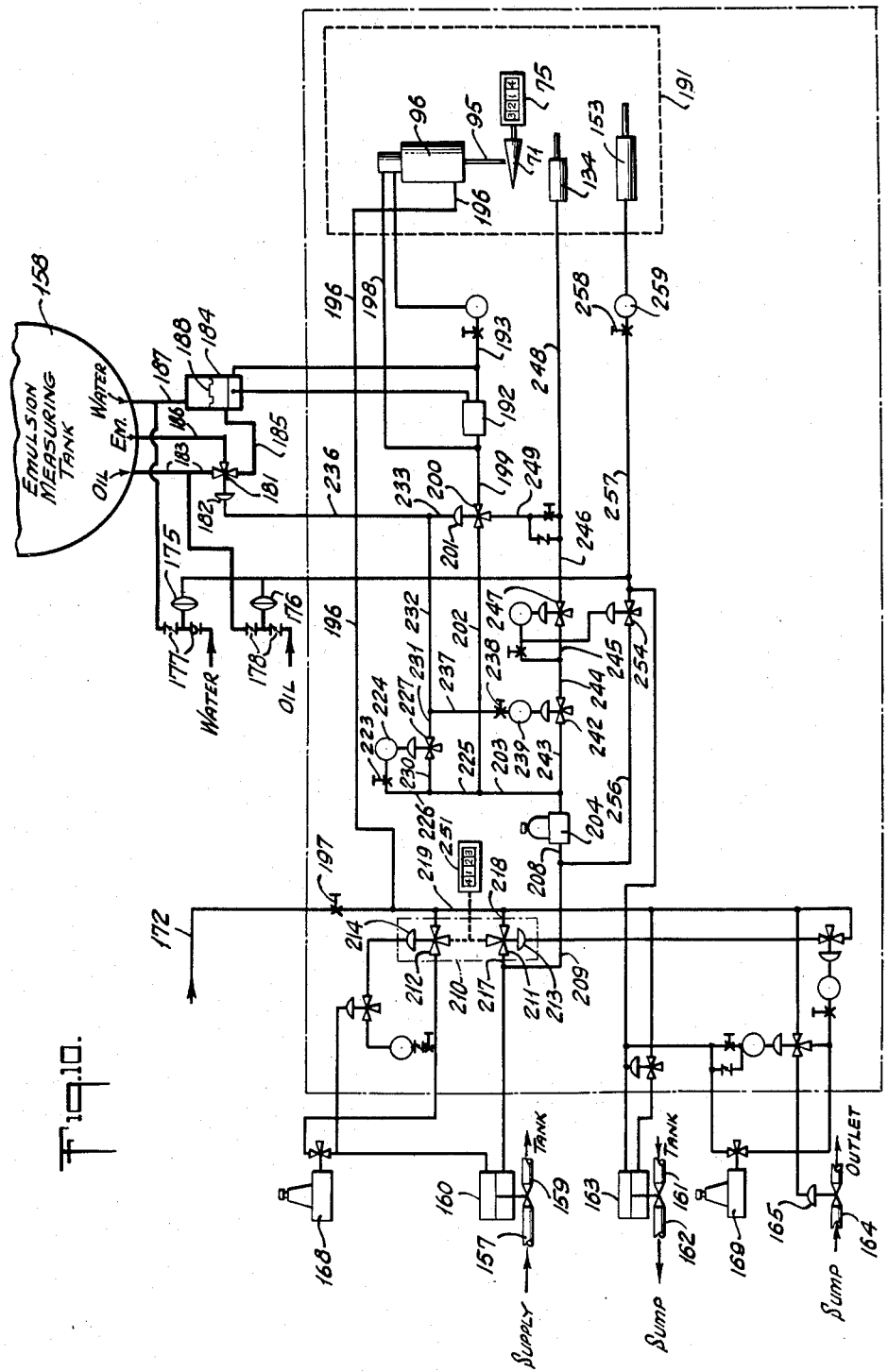
FIG. 10 is a schematic diagram showing a pneumatic control system for measuring and counting the number of predetermined volumes of emulsion that are passed through a given volume measuring tank.

*FIGURE 10 Operation*

To illustrate the operation of the ratio computer in connection with a particular application, reference is had to FIG. 10 where so much of the operation of an automatic liquid quantity measuring system will be described as is directly pertinent to the operation of the ratio computer which is employed in connection therewith.

Thus, there is shown in FIG. 10 a system for measuring the quantity of an emulsion containing oil and some water, which is generally the case in connection with the production of crude oil. There is shown a supply pipe 157 for introducing an emulsion to a quantity measuring tank 158 via another pipe 159 which leads to the tank 158 as indicated. In series with the pipes 157 and 159 there is a diaphragm actuated fill valve 160 that controls the introduction of emulsion to the tank 158. After the emulsion has filled the tank 158 to a predetermined measured level, it will be drained out from the tank via another pipe 161 which leads from the tank 158 as indicated. The pipe 161 leads from the tank to a sump, via another pipe 162 as indicated. There is a diaphragm actuated drain valve 163 that controls the flow of the emulsion from the tank 158 to a sump (not shown). The emulsion, or fluid then flows from the sump via another pipe 164 that has another diaphragm actuated drain valve 165 connected thereto for controlling the flow of the fluid from the sump to the outlet, as indicated.

The system for controlling the flow of the emulsion into the measuring tank 158 and out therefrom to drain the measured quantity, is pneumatic in nature and includes a pair of level control valves 168 and 169 that are actuated by the fluid level in the measuring tank 158, and in the sump tank (not shown) respectively. There is a pneumatic pressure supply line 172 that is preferably a line leading from the pressure gas on the crude oil delivery system, so that the operation of the level control valves 168 and 169 will be accurate. They will be actuated under these conditions because, e.g. the level controlled valve 168 is operated by the difference in the levels of the fluid in the tank 158 and the total pressure involved always includes the gas pressure that exists in the space above the fluid in the tank.

In order to employ the ratio computer in connection with the measuring of quantities of the emulsion in the tank 158, the density differences between the oil and the water of the emulsion as well as the density differences between the emulsion and the water, must be measured as was described above in connection with the method that was illustrated in FIGS. 1 and 4.

As indicated above, the density measurements of the oil, water and emulsion (all from the fluid that is being measured in the tank 158) are carried out by means of measuring the pressure differentials between equal height columns of these three liquids in the tank 158. As described in detail in my copending application Serial No. 665,095, filed June 11, 1957 (now Patent No. 3,009,359, issued November 21, 1961), the separated water and oil are pumped into small diameter columns that are located within the tank 158 so that the temperatures will be the same for all three fluids. Furthermore, the fluid level or pressure head for all three fluids is maintained equal by having the tops of the columns, or pipes that contain the water and the oil, slightly below the surface of the emulsion in the tank 158 at the time the measurements of differential pressures are made. This arrangement preferably includes pumping small quantities of the separated water and oil into the respective columns thereof, so as to keep the slight mixing that occurs at the top of each column from permeating, the column in each case.

In the present system this small quantity pumping is carried out by employing a pair of diaphragm-actuated pumps 175 and 176 that are actuated once each fill-and-drain cycle of the measuring tank 158. Thus, the pumps 175 and 176 force a small quantity of water and oil respectively into the column containing each of these liquids and cause this same small amount to be displaced out of the top of each column to maintain the pure liquid of each type in the respective column. Each of the diaphragm pumps 175 and 176 has a pair of check valves 177 and 178 respectively in connection therewith for providing the proper pumping action as the diaphragm is actuated to displace liquid on the pump action side thereof.

The differential pressures among the three columns of fluid, are measured in pairs against one another by employing a three way valve 181 that is actuated by a pneumatic diaphragm 182. Valve 181 acts to selectively connect either (1) the oil column via a pipe 183, to the lower side of a differential pressure unit 184 via another pipe 185; or (2) to connect the emulsion column (which consists of the emulsion fluid within measuring tank 158) via a pipe 186, to the same pipe 185 that connects to the lower side of the differential pressure unit 184. The unit 184 has a diaphragm 188 that is the element sensitive to the differences in pressure existing on the two sides thereof. In either of the alternative connections, as determined by the valve 181, the other side of the differential pressure unit 184 is connected via a pipe 187 to the water column within the tank 158.

Now, as will appear from the brief description that follows of the operation of the automatic measuring of fluid quantity by filling and draining the tank 158, there will be carried out a measurement of the percentage of oil that exists in each tank full of emulsion. This will be done with each complete cycle of fill and drain of the measured quantity of emulsion in tank 158. This percentage measurement is carried out by the ratio computer which has been described in considerable detail above in connection with FIGS. 5 through 9; and this ratio computer is schematically indicated in FIG. 10 by the dashed line enclosure 191. The principal elements of this computer 191 which are illustrated in FIG. 10 will be given the same reference numbers as those applied to the same elements in the detail description of the ratio computer.

In this way the operation of the ratio computer may be more readily related to the specific use with a system for measuring the percentage of oil in emulsion, that is illustrated in FIG. 10.

The differential pressure unit 184 may take various forms, e.g. it may be a commercial unit that is manufactured by Moore Products Company. Such a unit is connected to operate in a controlling manner with a pilot valve 192 so as to provide an output pneumatic pressure at pneumatic line 193, that depends directly upon the differential of the pressures applied to the diaphragm 188 within the unit 184. It is pointed out that the unit 184 may be termed a transmitter. Furthermore, the pilot valve 192 may take alternative forms while still providing the same output, i.e. a regulated pneumatic pressure which is dependent upon the differential of the pressures applied to the transmitter unit 184. The Moore Products Company equipment includes a transmitter (184) as well as a pilot valve (192), and also provides an alternative pilot valve structure (not shown) that could be employed in place of one that is illustrated, for connection to the transmitter.

The positioning member 96 is also a commercial item, and may be that manufactured by Conoflow Corporation and known as a "Cylinder Conomotor". This positioning member is a piston-cylinder structure that is adapted for pneumatic control, and that will cause a movement of the piston which is directly related to the amount of pneumatic pressure that is applied at a control input.

There is a pneumatic line 196 that is applied to the positioning member 96 as a cushion loading connection, and that is connected directly to the pneumatic pressure source line 172 on the system side of a valve 197. Then there is another pneumatic supply line 198 that is selectively connected to a secondary pneumatic supply via another pneumatic line 199 and a three way valve 200. Valve 200 is arranged so that a diaphragm actuator 201 thereof is biased to leave the valve connection straight through from line 199 to a line 202, so long as the diaphragm 201 is not receiving any pneumatic pressure. Thus the valve 200 stands normally open for connecting pneumatic pressure to the lines 199 and 198 in order to introduce supply pressure to the positioning member 96. This supply pressure for positioner 96 is available whenever supply pressure is applied to the line 202, and another line 203 that connects to the output side of a pressure regulator 204. Regulator 204 is selectively connected to the pneumatic supply (as introduced to the system by supply line 172) by means of pneumatic lines 208, 209 and one connection of a four way valve 210 that is schematically indicated as two mechanically connected three way valves 211 and 212. The four way valve 210 has two actuating diaphragms 213 and 214 which may be termed the fill and drain actuators respectively. The four way valve 210 is not biased to any position, but remains in the position taken up after actuation of either of the fill or drain diaphragms 213 or 214 respectively until the other one is actuated to return the valve to its other position.

Now, to continue to trace the secondary source of supply pneumatic pressure, it goes from line 209 over a short supply line 217 that leads to the three way valve 211. When the four way valve 210 is in its drain position, i.e. when diaphragm 214 is actuated, the three way valve 211 is open straight across so that the pneumatic line 217 is connected to a short pneumatic line 218 which joins a common pneumatic line 219 that is connected directly to the system side of the valve 197.

Consequently, the four way valve 21 controls a secondary pneumatic supply pressure source which is connected to energize positioning member 96. When this source is connected it will cause the piston rod 95 to take up an extended position in accordance with the difference in pressures as applied to the diaphragm 188 of unit 184 that controls the positioning of the member 96. At the point in an operating cycle where the measuring tank 158 has been filled and the density ratios are to be measured, the three way valve 181 will be standing in an unactuated position such that the pipe 183 to the oil column is directly connected to the pipe 185 that leads to one side of the diaphragm 188 of differential unit 184. At the same time the other side of the differential unit 184 is connected via the pipe 187 to the column of water in the measuring tank 158. Thus, a signal representing the difference in densities between the water and the oil is applied to control the positioning member 96, and the extension of the piston rod 95 will cause lateral movement of the cone drive member (see 89 and 90, FIGS. 5–9), over the surface of the cone 71 from the apex, for a distance that is proportional to the difference in densities as represented by the differential pressures of the oil and water columns.

After this, the positioning member 96 will have its piston rod 95 returned to the zero, or starting position when the secondary supply pressure that has been introduced via pneumatic line 198 is cut off. Such cut off takes place by reason of the actuation of three way valve 200, when the diaphragm 210 thereof receives pneumatic pressure supplied thereto. This actuation of valve 200 takes place after a predetermined short time delay that is created by a time delay unit which comprises a needle valve 223 and a volume receptacle 224. It will be observed that this time delay will commence upon the actuation of the four way valve 210 to its drain position (diaphragm 214 actuated) since this will connect the supply line 219 via three way valve 211 to the regulator 204 and thence via line 203 and another pneumatic line 225 plus still another line 226, to the needle valve 223, and the receptacle 224.

The end of this time delay is determined when the pressure has built up within the receptacle 224 to a sufficient extent to cause the actuation of a three way diaphragm actuated valve 227. Three way valve 227 is arranged so that when the diaphragm thereof is not actuated the valve is biased to a position such that the connection through the valve, i.e. from a line 230 to a line 231 remains closed at the line 230 side; while the connection in the valve from the line 231 is vented, or open to the atmosphere.

By reason of this arrangement, at the end of the time period indicated above, the three way valve 227 will be actuated and the pneumatic line 230 will be connected to line 231 and thence via another line 232 to a short line 233 that leads to the diaphragm 201 of three way valve 200. Actuation of the valve 200 will cut off the supply of pneumatic pressure to the positioning device or member 96 so that it will return to zero at this time.

At the same time the pneumatic pressure on line 232 is connected to a line 236 which leads to the diaphragm 182 of the three way valve 181. This means that the valve 181 will be actuated and will disconnect the pipe 183 from the pipe 185 and instead will connect the pipe 186 which is connected to the emulsion, to the pipe 185. Thus a new differential pressure situation is applied to the diaphragm 188 of differential pressure unit 184, and it will thus provide a different signal for actuating the pilot valve 192 of the servo elements which act to position the positioning member 96.

Also, simultaneously with the latter actions there will be commenced a second predetermined time delay. This second time delay begins at the end of the first delay, by reason of the introduction of pneumatic pressure from the line 231 to a line 237 that leads to a needle valve 238 of another time delay unit which includes a volume receptacle 239. The receptacle 239 has the diaphragm of a three way valve 242 connected thereto. Valve 242 is biased to have the through connection normally closed in the absence of any pneumatic pressure applied to its diaphragm, and the down stream side thereof is at the same time normally connected to be vented.

At the end of this second successive time delay period the three way valve 242 will be actuated, and will connect a pneumatic line 243 to a line 244 which leads to another line 245 and on to a line 246 via a normally open valve connection through a three way valve 247.

Pneumatic pressure will therefore be carried to the drive cylinder 134 via another pneumatic line 248. Also, pressure will be supplied over a line 249 to the three way valve 200 which now stands in its actuated position so that the pressure connection continues through valve 200 to the pneumatic line 199 and thus energizes the positioning member system in the same manner as already indicated above, for causing positioning member 96 to be positioned in accordance with the differential pressure status on the diaphragm 188 of the unit 184.

Member 96 is, of course, directly controlled by the pilot valve 192 that is in turn controlled by the unit 184.

Now, when the cone drive cylinder 134 is actuated, the drive bar of the positioning member 96 will be actuated into contact with the cone 71. Therefore, when the piston rod 95 moves outward from its zero position (to take up the position in accordance with the differential pressures between the emulsion and water columns) the cone 71 will be rotated for an amount that depends first upon the amount of lateral positioning that was provided when the first signal was applied to the positioning member 96 (as controlled by the differential pressure from the oil and water columns). Thus, the revolution counter 75 will be rotated for an amount that is directly proportional to the percentage of oil that is in the measured quantity of emulsion in the tank 158.

It will be appreciated that the revolution counter 75 acts as an integrating element, by adding or totaling the rotations after each of the measuring steps, as each tankful of fluid is measured.

The remaining elements of the pneumatic control system illustrated in FIG. 10, are concerned with the rest of the procedure that is involved in completing the cycle of a measurement of a volume of fluid in the tank 158. Such procedure includes the draining and refilling of the tank. None of this part of the cycle is pertinent to this invention and consequently it need not be described any further. However, it may be mentioned that there is an arrangement in connection with the four way valve 210, for providing a mechanical connection with a counter element 251 so that each time the measuring tank 158 has been filled to the predetermined level and then drained, a count is taken which is indicative of the predetermined volume of fluid having been measured by the tank 158. In this manner a comparison may be maintained between the total volume of emulsion being measured, and the total volume of oil that was contained in such total volume of emulsion, simultaneously therewith.

In connection with the completion of a drain cycle for the measuring tank 158, there is provision for applying pneumatic pressure to the carriage return cylinder 153 of the ratio computer 191. This includes another three way valve 254 that has its actuating diaphragm connected in parallel with the diaphragm of three way valve 247. Because of this connection, valve 254 is actuated at the same time as valve 247, which is after the third successive time delay that was indicated above. However, when the three way valve 254 is actuated, it will open a connection through for connecting a pneumatic line 256 to a pneumatic line 257 that leads to the carriage return cylinder 153 via a time delay unit including a needle valve 258 and a volume receptacle 259. Whereas, the actuation of the valve 247 shifted the connections so as to vent the down stream side, i.e. pneumatic line 246 and connected circuits. Thus at the end of the "fill" portion of a fill and drain cycle of the measuring tank 158, the ratio computer 191 will have its elements returned to the starting positions ready for another measurement of the two successive input quantities which will provide the ratio output indication desired.

It is pointed out that the last mentioned delay unit (valve 258 and receptacle 259) is provided to give time for making sure that the cone drive cylinder 134 is released, so as to remove the drive bar from the cone 71 before the resetting of the various elements to their starting positions takes place. This prevents any reverse rotation of the cone 71 and counter 75.

While certain embodiments of the invention have been set forth above in considerable detail in accordance with the applicable statutes, this is not to be taken as in any way limiting the invention but merely as being descriptive thereof.

What is claimed as the invention is:

1. A system for measuring the volume of oil in a predetermined volume of a mixture containing said oil and some water, comprising in combination means for measuring a first density difference between said mixture and said water, separate means for measuring a second density difference between said oil and said water, and means for measuring the ratio of said first and said second density differences whereby the percent of said oil in said predetermined volume of mixture is directly determined.

2. A system for measuring the volume of oil in a predetermined volume of a mixture containing said oil and some water, comprising in combination means for measuring a first density difference between said mixture and said water, separate means for measuring a second density difference between said oil and said water, means for measuring the ratio of said first and said second density differences whereby the percent of said oil in said predetermined volume of mixture is directly determined, and means for integrating said percent of oil over a given number of said predetermined volumes of mixture to determine the total quantity of oil delivered.

3. A system for measuring the volume of oil in a predetermined volume of a mixture containing said oil and some water, comprising in combination means for measuring a first density difference between said mixture and said water, separate means for measuring a second density difference between said oil and said water, means for measuring the ratio of said first and said second density differences comprising linear displacement means actuated in accordance with said first and said second density difference measuring means, and means actuated by said linear displacement means for providing a rotational output proportional to the quotient of said second density difference divided by said first density difference.

4. A system for measuring the volume of oil in a predetermined volume of a mixture containing said oil and some water, comprising in combination means for measuring a first density difference between said mixture and said water, separate means for measuring a second density difference between said oil and said water, means for measuring the ratio of said first and said second density differences comprising first linear displacement means actuated in accordance with said first density difference measuring means, second linear displacement means actuated in accordance with said second density difference measuring means, and means actuated by said first and second displacement means for providing a rotational output proportional to the quotient of said second density difference divided by said first density difference.

5. A system for measuring the volume of oil in a predetermined volume of a mixture containing said oil and some water, comprising in combination means for measuring a first density difference between said mixture and said water, separate means for measuring a second density difference between said oil and said water, means for measuring the ratio of said first and said second density differences comprising linear displacement means actuated in accordance with said first and said second density difference measuring means, means actuated by said linear displacement means for providing a rotational output proportional to the quotient of said second density difference divided by said first density difference, and integrating means actuated by said rotational output for providing a total indication of only the volume of oil measured with the predetermined volume of mixture.

6. A system for measuring the volume of oil in a predetermined volume of a mixture containing said oil and some water, comprising in combination means for measuring a first density difference between said mixture and said water, separate means for measuring a second density difference between said oil and said water, means for measuring the ratio of said first and said second density differences comprising first linear displacement means actuated in accordance with said first density difference measuring means, second linear displacement means actuated in accordance with said second density difference measuring means, means actuated by said first and second displacement means for providing a rotational output proportional to the quotient of said second density difference divided by said first density difference, and integrating means actuated by said rotational output for providing a total indication of only the volume of oil measured with the predetermined volume of mixture.

7. A system for measuring the volume of oil in a predetermined volume of a mixture containing said oil and some water, comprising in combination means for measuring a first density difference between said mixture and said water, separate means for measuring a second density difference between said oil and said water, means for measuring the ratio of said first and said second density differences comprising linear displacement means actuated in accordance with said first and said second density difference measuring means, conical surface means having an axial output shaft, said conical surface being so proportioned that the circumference thereof at any point along the axis is equal to the distance of such point from the apex measured along the surface, transverse drive means actuated by said linear displacement means for rotating said conical surface means, first means connected to said linear displacement means for moving said transverse means laterally thereof along the surface of said conical means for a distance proportional to said second density difference, and second means connected to said linear displacement means for moving said transverse means longitudinally thereof in driving relation across the surface of said conical means for a distance proportional to said first density difference whereby said output shaft is rotated an amount equal to the ratio of said second density difference to said first density difference.

8. A ratio computer for periodically measuring the ratio of two quantities comprising a cone having the proportions thereof such that the circumference at any point is equal to the distance from such point to the apex of the cone, a transverse cone drive member for rotating said cone about its axis, means for positioning said member laterally for a distance along the surface of said cone proportional to one of said quantities, and means for translating said member longitudinally thereof while in driving relation with a circumference of said cone for effective distance proportional to the other of said quantities whereby said cone is rotated about its axis an amount equal to the ratio of said two quantities.

9. A ratio computer for periodically measuring the ratio of two quantities comprising a cone having the proportions thereof such that the circumference at any point is equal to the distance from such point to the apex of the cone, an elongated friction drive member situated transversely relative to the axis of said cone, means for positioning said member laterally for a distance along the surface of said cone proportional to one of said quantities, and piston means for translating said member longitudinally while in friction contact tangentially with said cone for a distance proportional to the other of said quantities whereby said cone will be rotated about its axis an amount equal to the ratio of said two quantities.

10. A ratio computer for periodically measuring the ratio of two quantities comprising a cone having the proportions thereof such that the circumference at any point is equal to the distance from such point to the apex of the cone, an elongated friction drive member situated transversely relative to the axis of said cone, piston means for providing a linear translation proportional to each of said two quantities, mounting means for said drive member including means connecting said piston means thereto, first means connected to said mounting means for causing lateral positioning of said drive member in proportion to one of said quantities, and second means connected to said mounting means for placing said drive member in contact with said cone so that the linear translation proportional to the other of said quantities will cause the cone to be rotated an amount equal to the ratio of said two quantities.

11. A ratio computer for periodically measuring the ratio of two quantities comprising a cone having the proportions thereof such that the circumference at any point is equal to the distance from such point to the apex of the cone, an elongated friction drive member situated transversely relative to the axis of said cone, piston means for providing a linear translation proportional to each of two quantities, mounting means for said drive member including means connecting said piston means thereto, a carriage for supporting said piston means and said drive member, said carriage being movable laterally of said drive member, means for causing said carriage to move laterally in one direction only upon first actuation of said piston means for a distance proportional to one of said quantities, and means for maintaining driving relationship between said drive member and said cone upon second actuation of said piston means for a distance proportional to the other of said quantities whereby said cone is rotated an amount equal to the ratio of said two quantities.

12. A ratio computer for periodically measuring the ratio of two quantities comprising a cone having the proportions thereof such that the circumference at any point is equal to the distance from such point to the apex of the cone, an elongated friction drive member situated transversely relative to the axis of said cone, piston means for providing a linear translation proportional to each of said two quantities, mounting means for said drive member including means connecting said piston means thereto, a carriage for supporting said piston means and said drive member, said carriage being movable laterally of said drive member, means for causing said carriage to move laterally in one direction only upon first actuation of said piston means for a distance proportional to one of said quantities, means for maintaining driving relationship between said drive member and said cone upon second actuation of said piston means for a distance proportional to the other of said quantities whereby said cone is rotated an amount equal to the ratio of said two quantities, and means for returning said carriage to a starting position with said drive member located across the apex of the cone.

13. A ratio computer for periodically measuring the ratio of two quantities comprising a cone having the proportions thereof such that the circumference at any point along the slant distance from the apex is equal to a predetermined function of the said slant distance, a transverse cone drive member for rotating said cone about its axis, means for positioning said drive member laterally for a distance along said slant distance an amount proportional to one of said quantities, and means for translating said drive member longitudinally thereof while in driving relation with a circumference of said cone for effective distance proportional to the other of said quantities whereby said cone is rotated about is axis an amount proportional to a predetermined function of the ratio of said two quantities.

References Cited in the file of this patent

UNITED STATES PATENTS

| 1,416,210 | Jung et al. | May 16, 1922 |
| 1,432,375 | Witt | Oct. 17, 1922 |
| 1,732,434 | Dawley | Oct. 22, 1929 |
| 1,888,577 | Stephens et al. | Nov. 22, 1932 |
| 2,758,477 | Haeber | Aug. 14, 1956 |